Oct. 23, 1945.   L. P. CROSMAN   2,387,648
CLUTCH
Filed Oct. 2, 1943

Inventor
Loring P. Crosman,
By C.W. Anderson & Son.
Attorney

Patented Oct. 23, 1945

2,387,648

UNITED STATES PATENT OFFICE 2,387,648

CLUTCH

Loring Pickering Crosman, South Orange, N. J., assignor to Monroe Calculating Machine Company, Orange, N. J., a corporation of Delaware Application October 2, 1943, Serial No. 504,765

7 Claims. (Cl. 192—48)

The invention relates to clutches wherein a driving shaft is provided with a driving connection with one or alternatively the other of two members loose thereon in accord with the direction of the shift of coupling elements of a member fast upon said shaft, an object of the invention being to provide an improved device of this description having means for effecting the shift and for locking the one loose member against rotation and for simultaneously locking the driving connection with the other loose member during a cycle of rotation. Another object is to provide means for driving either the main shaft of a Monroe calculating machine or the shaft of the device for shifting the carriage of said machine, but never both at the same time. Other objects and advantages will appear hereinafter or will be obvious.

The invention consists in the novel construction and combination of parts as herein set forth in the claims.

Figure 1:
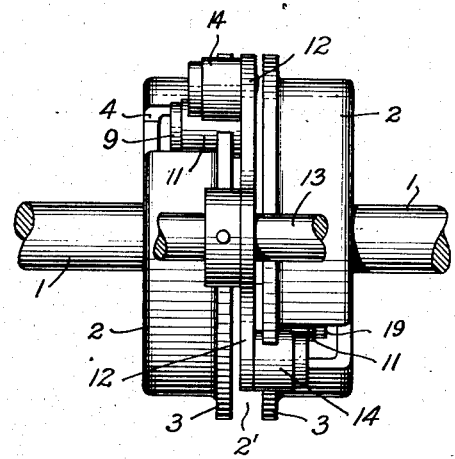
Figure 1 is a front elevation of the clutch.
Figure 2:
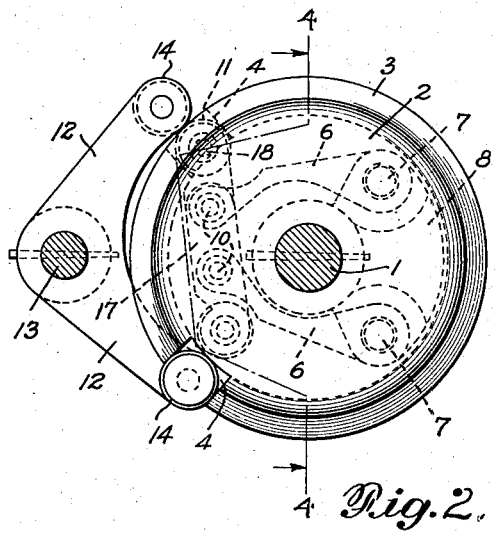
Figure 2 is a side elevation of the same showing one of the loose members having driving connection with the drive shaft, parts being shown in dotted lines.
Figure 4:
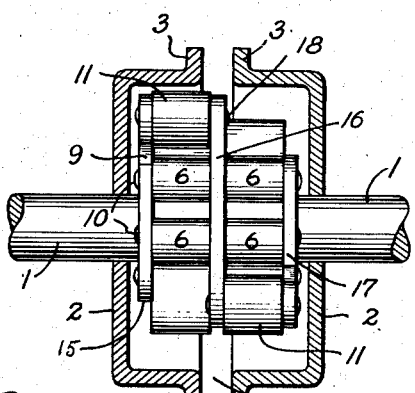
Figure 4 is a section on the line 4—4, Fig. 2.
Figure 3:
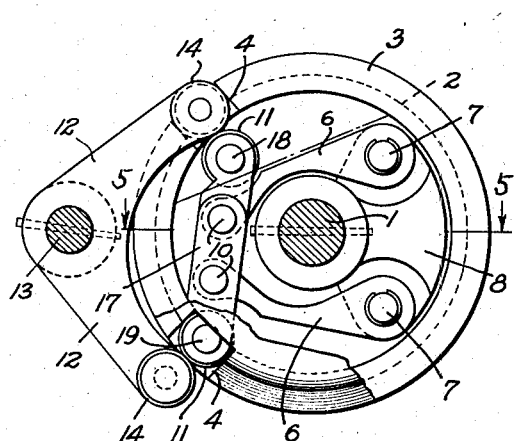
Figure 3 is a view similar to Fig. 2, with parts broken away, showing the other loose member having driving connection with the drive shaft.
Figure 5:
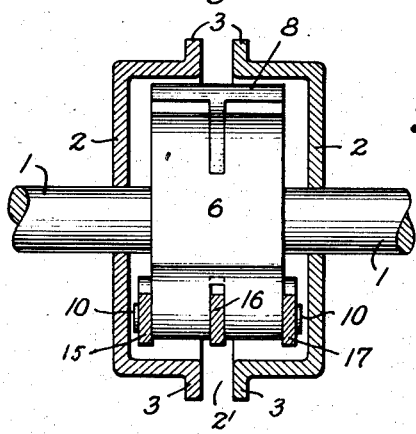
Figure 5 is a section on the line 5—5, Fig. 3.

In the drawing, the numeral 1 designates a driving shaft, which may be reversible, and whereon are loosely mounted two hollow cylindrical cupped spaced clutch members 2, 2, the open ends of which face each other, providing a boxing wherein works the fast member of the clutch having the shiftable coupling elements to be described, said loose members having each an inner circumferential outwardly extending flange 3 and a radial circumferential slot 4.

Said fast member of the clutch includes a crank arm 8 fast upon the drive shaft 1; shiftable coupling elements connected together to work in unison and including links 6, 6, each pivoted at one end thereof at 7 to said crank arm; a frame 9 with which the opposite ends of said links have pivotal connection at 10, 10, and oppositely extending lateral rollers 11, 11, journaled at opposite ends of and upon opposite sides of said frame 9. The pivots 10, 10 are spaced apart by a distance which is less than that between the pivots 7, 7, whereby in the shifting of said coupling elements said rollers 11, 11, will be respectively thrust outwardly into the radial slot 4 of and establish a driving connection with one or alternatively the other of said loose members 2, 2, in accord with the direction of the shift and the roller not so thrust outwardly will be withdrawn inwardly within the interior of the related member.

Shiftable control means includes a bell crank 12 located adjacent to and opposite the space 2' separating the loose clutch members 2, 2, said bell crank being fast upon and rockable with a shaft 13 having bearings in the stationary frame (not shown), said bell crank being provided at the free ends of its arms with oppositely extending lateral rollers 14, 14, contacting the rollers 11, 11, of the shiftable coupling elements, one roller 14 of the bell crank engaging the radial slot 4 of one of the loose clutch members 2 to lock the latter against rotation and the other roller 14 of the bell crank simultaneously riding upon the outer periphery of and locking the driving connection with the other loose clutch member 2 during a cycle of rotation.

The two pairs of rollers 11, 11 and 14, 14, are located in registration with the slots 4, 4, of the loose clutch members 2, 2, only at the start of and at the finish of the cycle of rotation, so that the drive being once started it is only at the finish of the cycle of rotation that any shifting of the coupling elements is possible from the one member 2 to the other.

The frame 9 is composed of three spaced bars 15, 16 and 17, riveted together by four pins 10, 10, 18 and 19, also spaced apart. The pin 18 has the one roller 11 journaled thereon and is riveted to the bars 15 and 16. The pin 19 has the other roller 11 journaled thereon and is riveted to the bars 16 and 17. The two remaining pins 10, 10, have the adjacent ends of the links 6, 6, pivoted thereon and are riveted to the bars 15 and 17, also passing through perforations of the middle bar 16.

Due to the fact that the shift of the one roller 11 into engagement with the slot 4 of the related loose clutch member 2 is by a movement of the roller which is radial with respect to said member, whereas the driving pressure of the roller against the wall of the slot is at right angles to said radial movement, there will be no tendency to force the other roller 11 against the inner circumferential wall of the other loose clutch member 2 in its movement therearound during the cycle. Such a tendency would of course be objectionable as causing undue friction and wear. In the Monroe machine, the main shaft would have a driving connection with one of the loose members 2, and the shaft of the device for shifting the carriage of said machine would have a driving connection with the other loose member 2.

An object of the use of rollers for the shiftable control means and for the shiftable coupling elements is that precise relative positioning of the shafts 1 and 13 may be rendered unnecessary.

It will be noted that this clutch has no neutral position, one of the members 2 always having a driving connection with the drive shaft but never both members 2.

Obviously the invention will remain effective for the purpose stated for an indefinite number of cycles of rotation so long as the control means remains in operative position. Obviously also the control means would be shifted when the parts are in position of rest.

I claim:

1. In a clutch, a drive shaft, two annular driven members loosely mounted thereon and provided each with a seat, a driving member fast upon said shaft and having coupling elements shiftable to engage a seat of and establish a driving connection with one or alternatively the other of said loose members in accord with the direction of the shift, and shiftable control means having locking elements contacting said coupling elements, one locking element of said control means engaging a seat of one of said loose members to lock the latter against rotation, and the other locking element simultaneously riding upon the outer periphery of and locking the driving connection with the other loose member during a cycle of rotation.

2. In a clutch, a reversible drive shaft, two annular driven members loosely mounted thereon and provided each with a seat, a driving member fast upon said shaft and having coupling elements shiftable to engage a seat of and establish a driving connection with one or alternatively the other of said loose members in accord with the direction of the shift, and shiftable control means having locking elements contacting said coupling elements, one locking element of said control means engaging a seat of one of said loose members to lock the latter against rotation, and the other locking element simultaneously riding upon the outer periphery of and locking the driving connection with the other loose member during a cycle of rotation.

3. In a clutch, a driving shaft, two annular driven members loosely mounted thereon and provided each with a slot, a driving member fast upon said shaft and having coupling elements including rollers, said elements being shiftable to engage said rollers respectively with a slot of and establish a driving connection with one or alternatively the other of said loose members in accord with the direction of the shift, and shiftable control means having rollers contacting the rollers of the coupling elements, one roller of the control means engaging the slot of one of said loose members to lock the same against rotation and the other roller of the control means simultaneously riding upon the outer periphery of and locking the driving connection with the other loose member during a cycle of rotation.

4. In a clutch, a reversible drive shaft, two annular driven members loosely mounted thereon and provided each with a slot, a driving member fast upon said shaft and having coupling elements including rollers, said elements being shiftable to engage said rollers respectively with a slot of and establish a driving connection with one or alternatively the other of said loose members in accord with the direction of the shift, and shiftable control means having rollers contacting the rollers of the coupling elements, one roller of the control means engaging the slot of one of said loose members to lock the same against rotation and the other roller of the control means simultaneously riding upon the periphery of and locking the driving connection with the other loose member during a cycle of rotation.

5. In a clutch, a drive shaft, two annular driven members loose upon said shaft and provided each with a radial slot, a driving member fast upon said shaft and having coupling elements including rollers, said elements being shiftable to shift said rollers respectively radially of one or alternatively the other of said loose members in accord with the direction of the shift to engage said rollers respectively with the slot of and establish a driving connection with one or alternatively the other of said loose members, and shiftable control means having rollers contacting the rollers of the coupling elements, one roller of the control means engaging the slot of one of the loose members to lock the same against rotation and the other roller of the control means simultaneously riding upon the periphery of and locking the driving connection with the other loose member during a cycle of rotation, the rollers of the coupling elements having respectively driving engagement with a wall of the slot of the related loose member at right angles to the radial shifting movement of the roller.

6. In a clutch, a drive shaft, two annular driven members loosely mounted thereon and provided each with a radial slot, a crank arm fast upon said shaft, shiftable coupling elements including two links pivoted at one end thereof to said crank arm, a frame with which the other ends of said links have pivotal connection, and oppositely extending lateral rollers journaled at the opposite ends of and upon opposite sides of said frame, the pivots of said links to said frame being spaced apart by a distance which is less than that between the pivots of said links to said crank arm whereby in the shifting of said coupling elements said rollers will be respectively thrust outwardly into the slot of and establish a driving connection with one or alternatively the other of said loose members in accord with the direction of the shift, and shiftable control means including a rock shaft journaled in the stationary frame, and a bell crank upon said rock shaft having oppositely extending lateral rollers contacting the rollers of said coupling elements, one roller of said bell crank engaging the slot of one of said loose members to lock the latter against rotation and the other roller of the bell crank simultaneously riding upon the periphery of and locking the driving connection with the other of said loose members during a cycle of rotation.

7. In a clutch, a drive shaft, two annular driven members loosely mounted thereon and provided each with a radial slot, a crank arm fast upon said shaft, shiftable coupling elements including two links pivoted at one end thereof to said crank arm, a frame with which the other ends of said links have pivotal connection, and oppositely extending lateral rollers journaled at the opposite ends of and upon opposite sides of said frame, the pivots of said links to said frame being spaced apart by a distance which is less than that between the pivots of said links to said crank arm whereby in the shifting of said coupling elements said rollers will be respectively thrust outwardly into the slot of and establish a driving connection with one or alternatively the other of said loose members in accord with the direction of the shift, and shiftable control means including a rock shaft journaled in the stationary frame, and a bell crank upon said rock shaft having oppositely extending lateral rollers contacting the rollers of said coupling elements, one roller of said bell crank engaging the slot of one of said loose members to lock the latter against rotation and the other roller of the bell crank simultaneously riding upon the periphery of and locking the driving connection with the other of said loose members during a cycle of rotation, said rollers in the shifting of said coupling elements having movement radially of said loose members and having respectively driving engagement with a wall of the slot of the related loose member at right angles to the radial shifting movement of the roller.

LORING PICKERING CROSMAN.